United States Patent [19]

Delwiche

[11] Patent Number: 4,748,999
[45] Date of Patent: Jun. 7, 1988

[54] FLOW REGULATING DEVICE

[76] Inventor: John L. Delwiche, 316 California Ave., #520, Reno, Nev. 89509

[21] Appl. No.: 934,399

[22] Filed: Nov. 24, 1986

Related U.S. Application Data

[60] Division of Ser. No. 628,749, Jul. 9, 1984, Pat. No. 4,624,278, and a continuation-in-part of Ser. No. 291,355, Aug. 10, 1981, Pat. No. 4,458,714.

[51] Int. Cl.$^4$ .................................. B01D 17/025
[52] U.S. Cl. ................................. 137/172; 137/192
[58] Field of Search ..................... 137/172, 192, 599

[56] References Cited

U.S. PATENT DOCUMENTS

| | | | |
|---|---|---|---|
| 1,995,742 | 3/1935 | Linnmann | 137/172 X |
| 2,348,757 | 5/1944 | Samiran | 137/172 X |
| 2,551,404 | 5/1951 | Wiggins | 137/172 X |
| 4,132,238 | 1/1979 | Clark | 137/172 |

*Primary Examiner*—Alan Cohan
*Attorney, Agent, or Firm*—Limbach, Limbach & Sutton

[57] ABSTRACT

Apparatus for regulating the flow of a subject fluid which includes immiscible fluids having differing densities such as oil and water, wherein plug means are provided which sink in oil and float in water, said plug means being positioned to control the flow of fluids through a scupper aperture. The plug means cause a sealing surface to move in and out of contact with the scupper aperture. Means are provided to enhance the separation of the sealing surface from the scupper aperture when fluid flow is to be permitted, and to increase the fluid tightness of the seal when fluid flow is to be prevented. Means are also provided for reducing the effects of turbulence in the subject flow, and hence to enhance the separation of the immiscible fluids from one another.

2 Claims, 8 Drawing Sheets

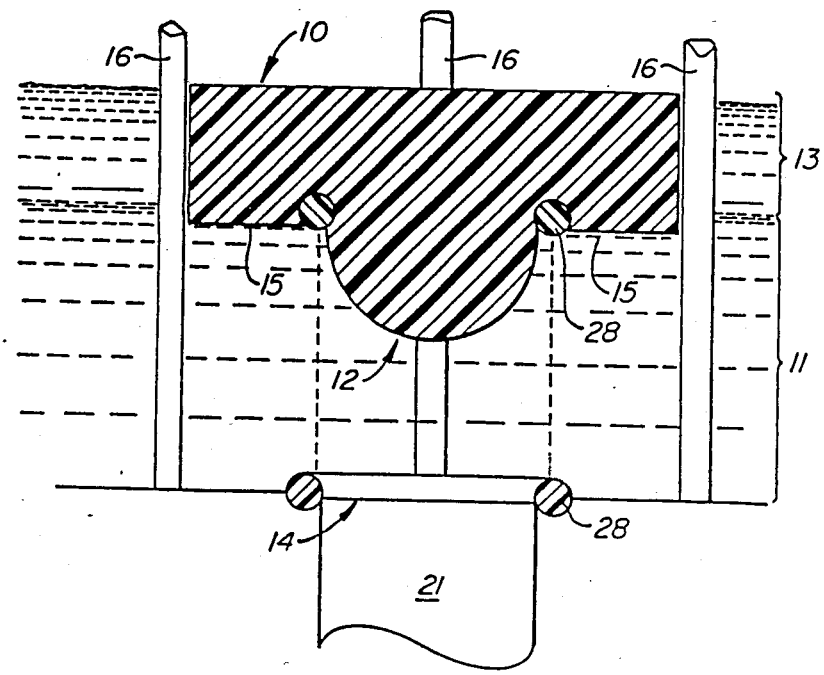
FIG._1.
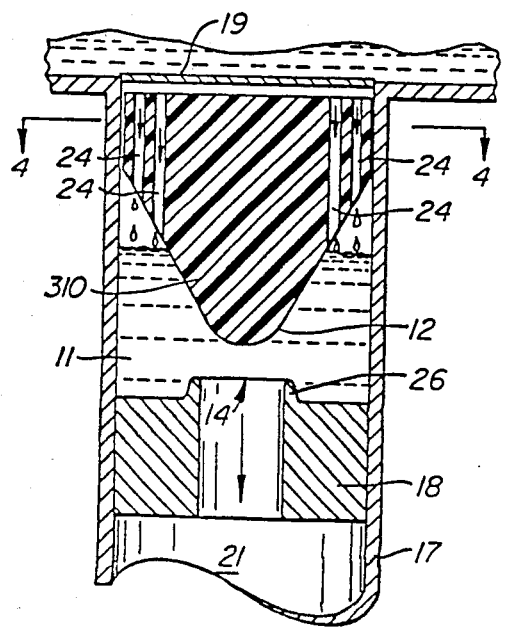
FIG._2.
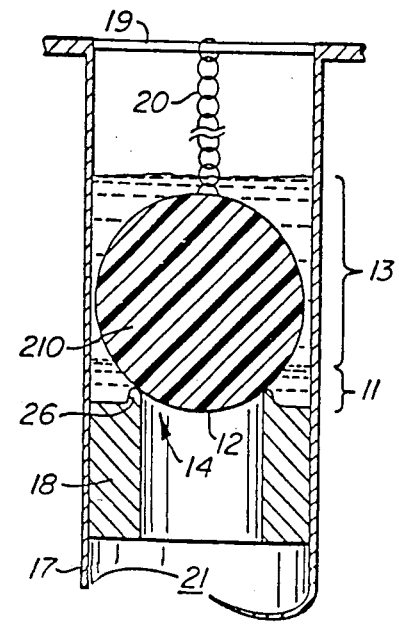
FIG._3.

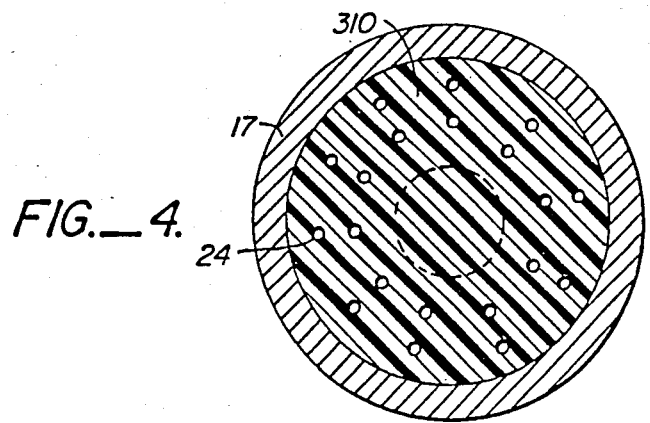
FIG._4.
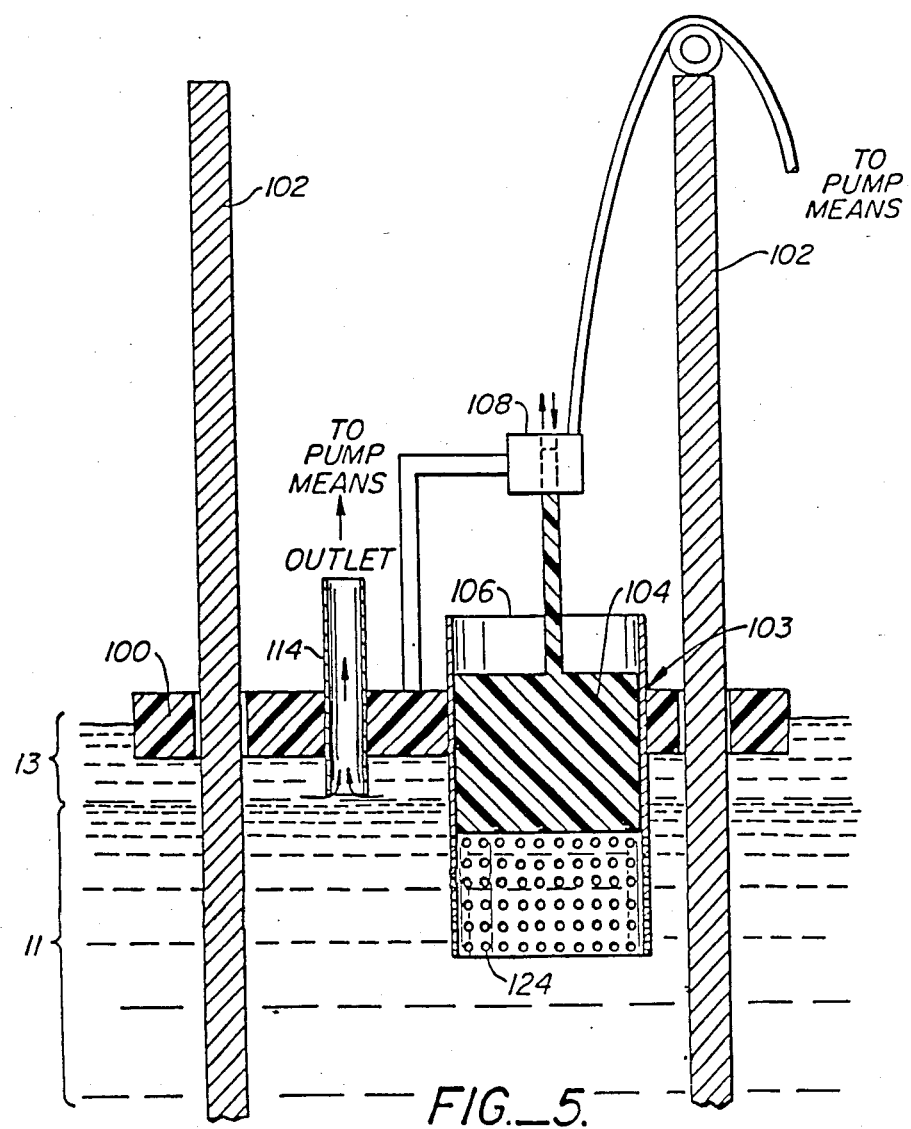
FIG._5.

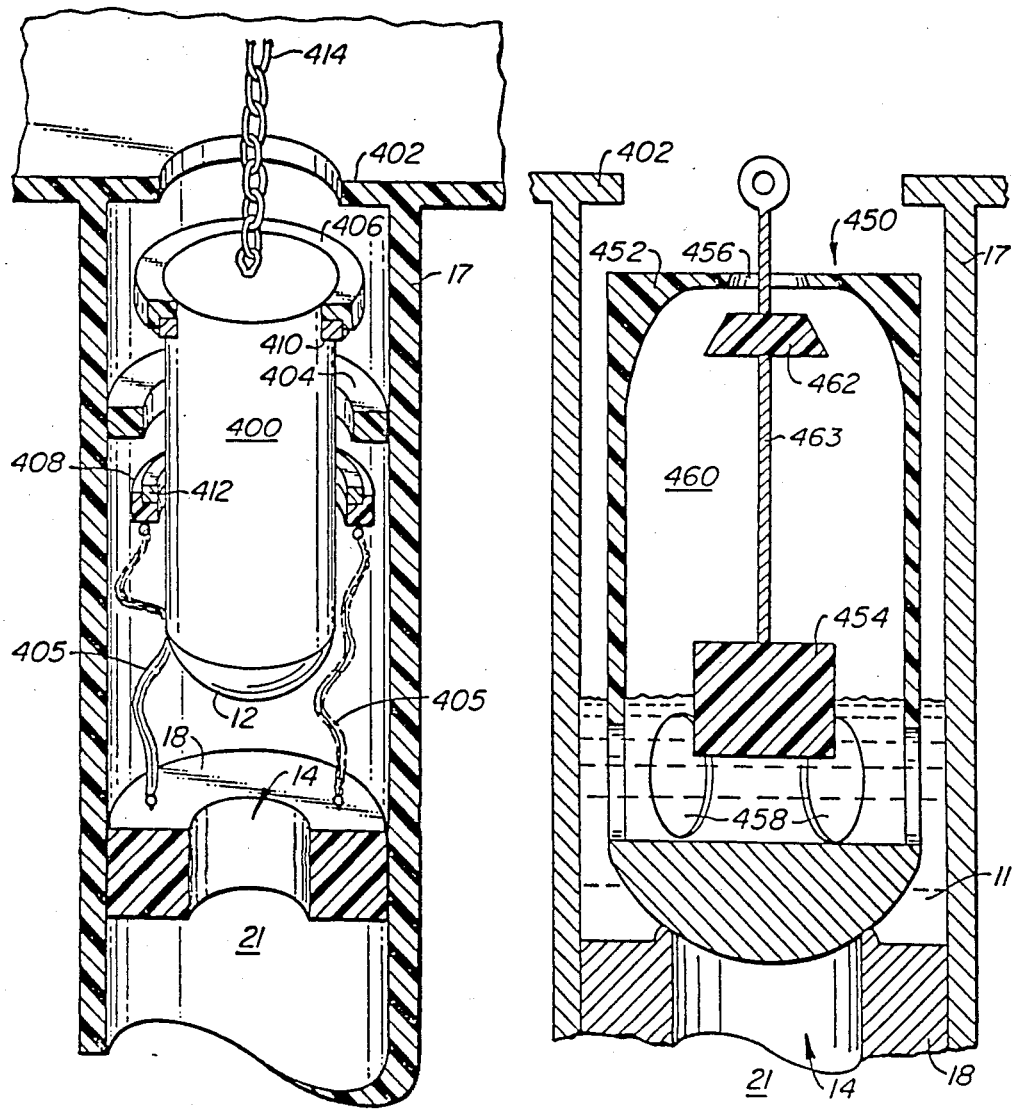
FIG._6.  FIG._7.

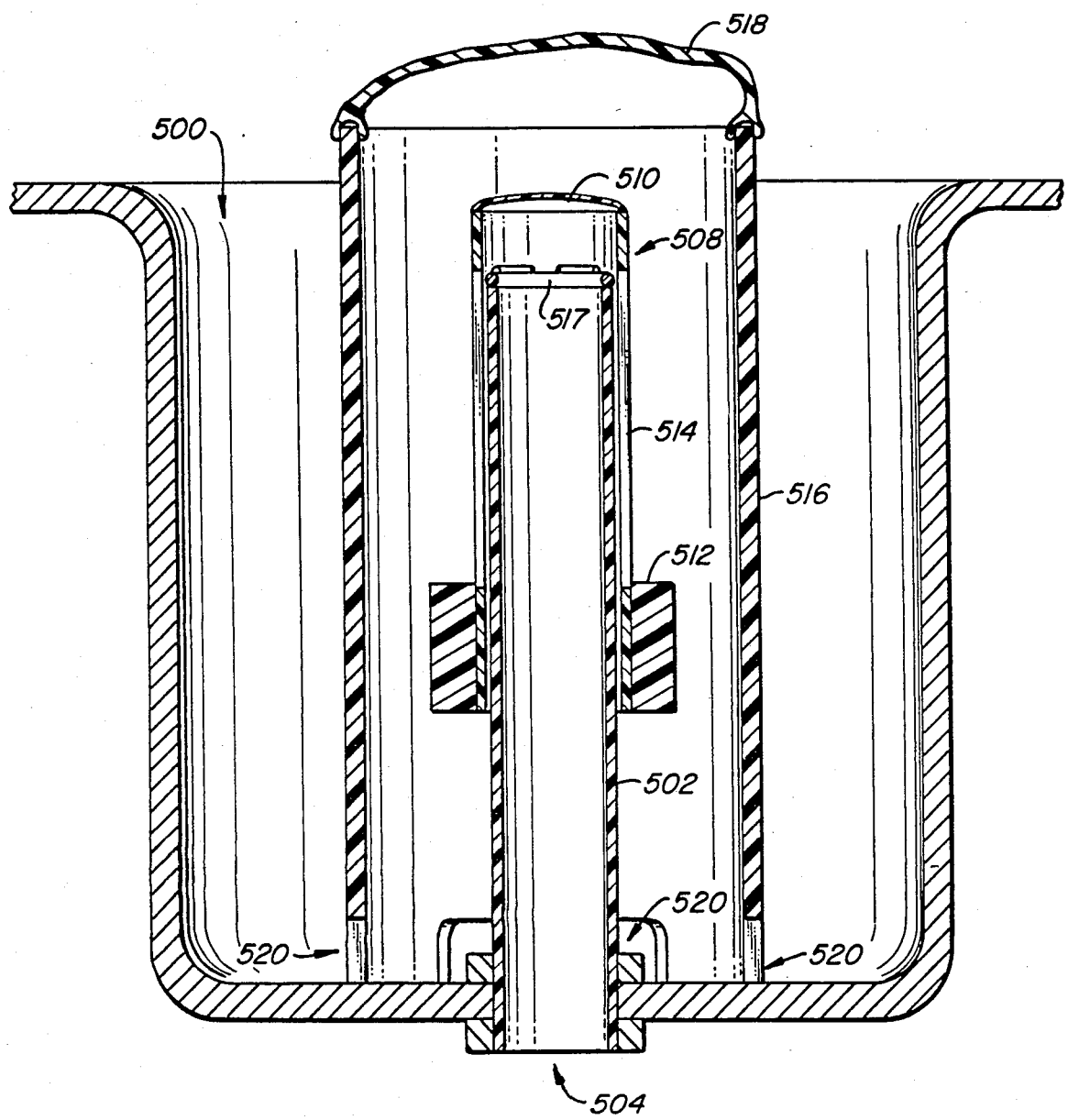
FIG._8.

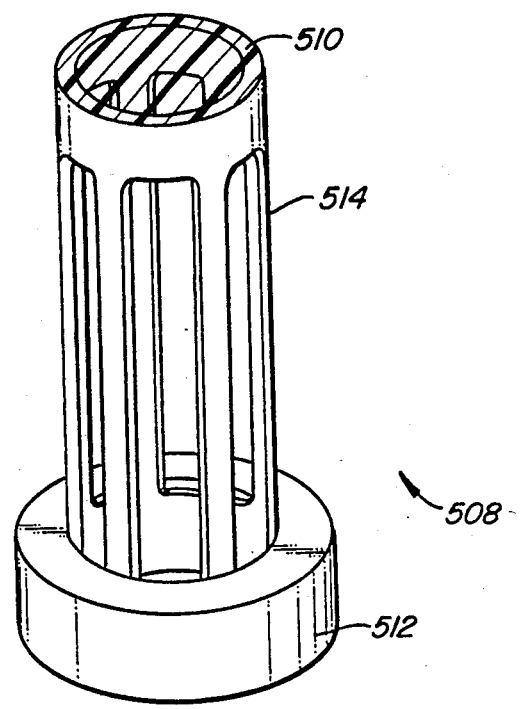
FIG._9.
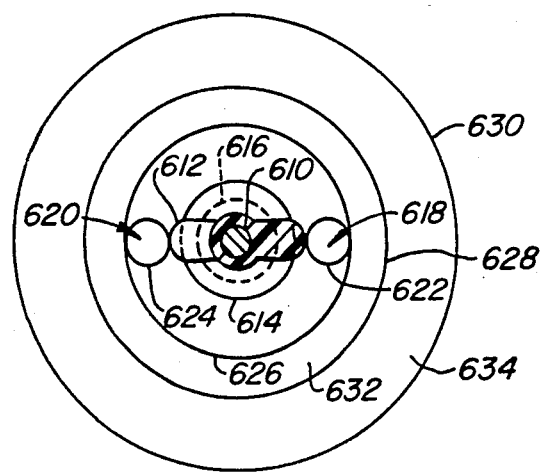
FIG._11.

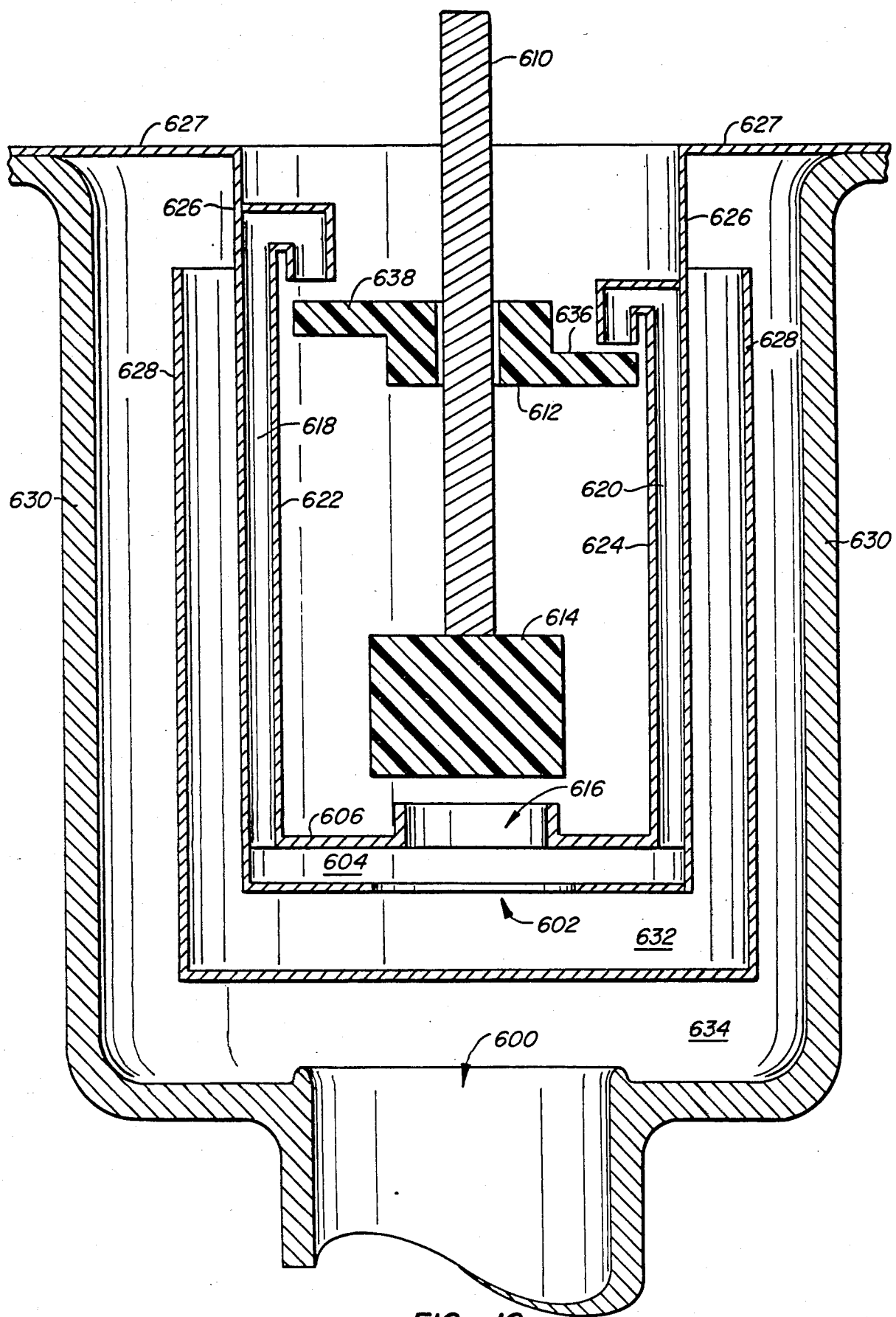
FIG._10.

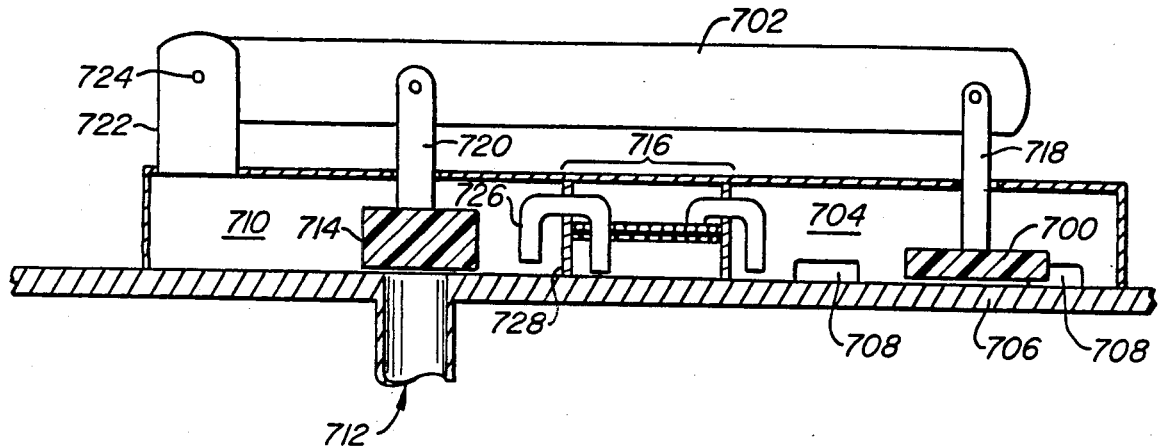
FIG._12.
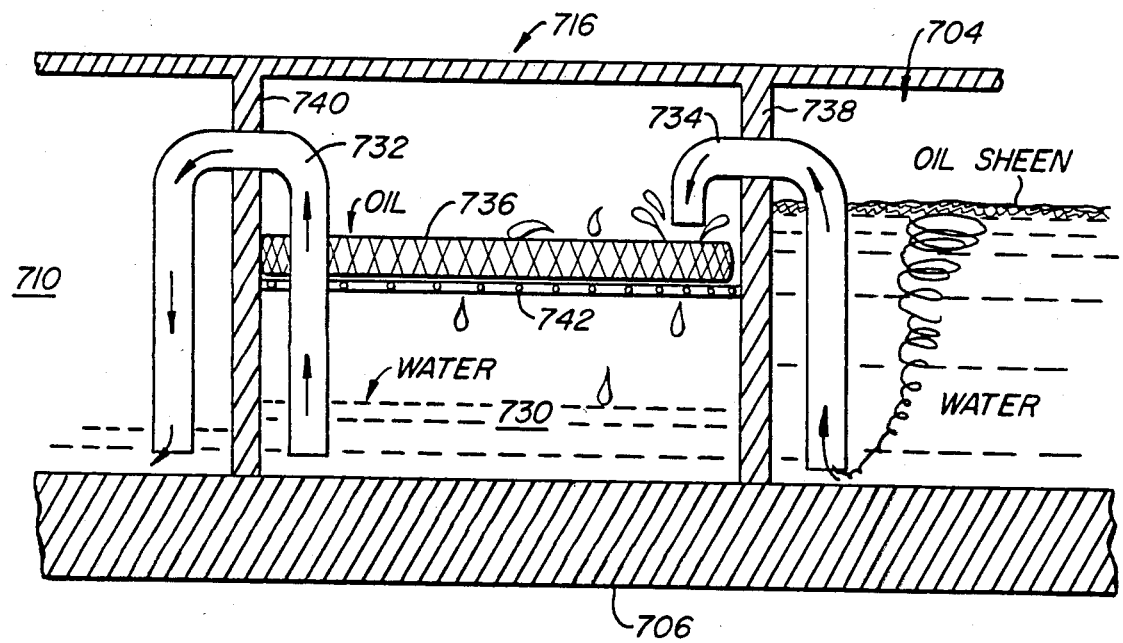
FIG._13.

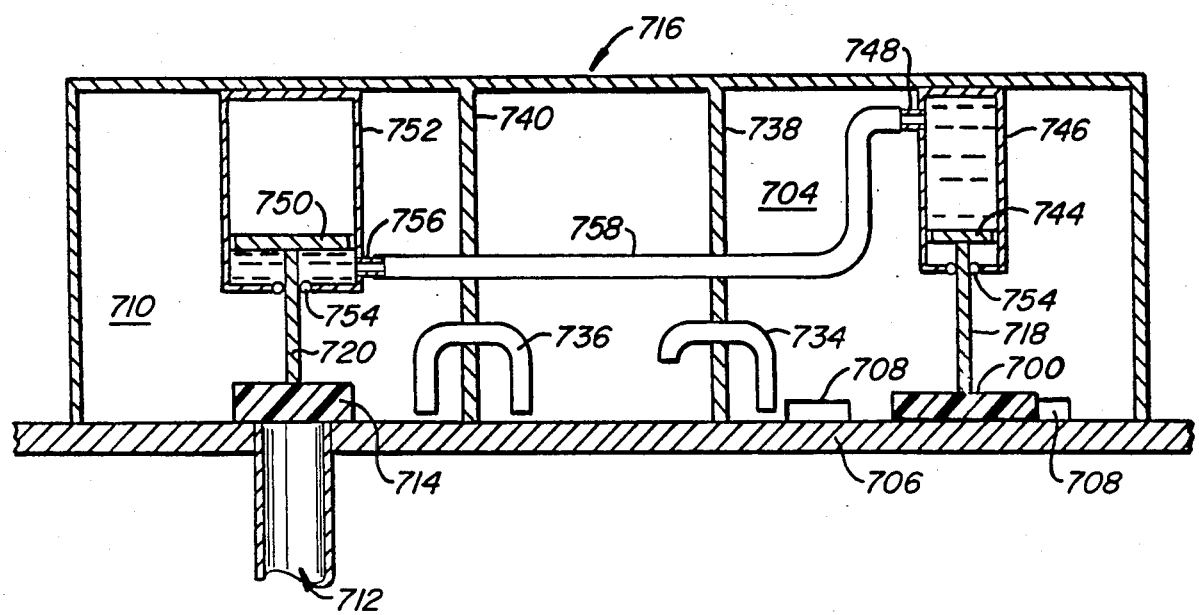
FIG.—14.
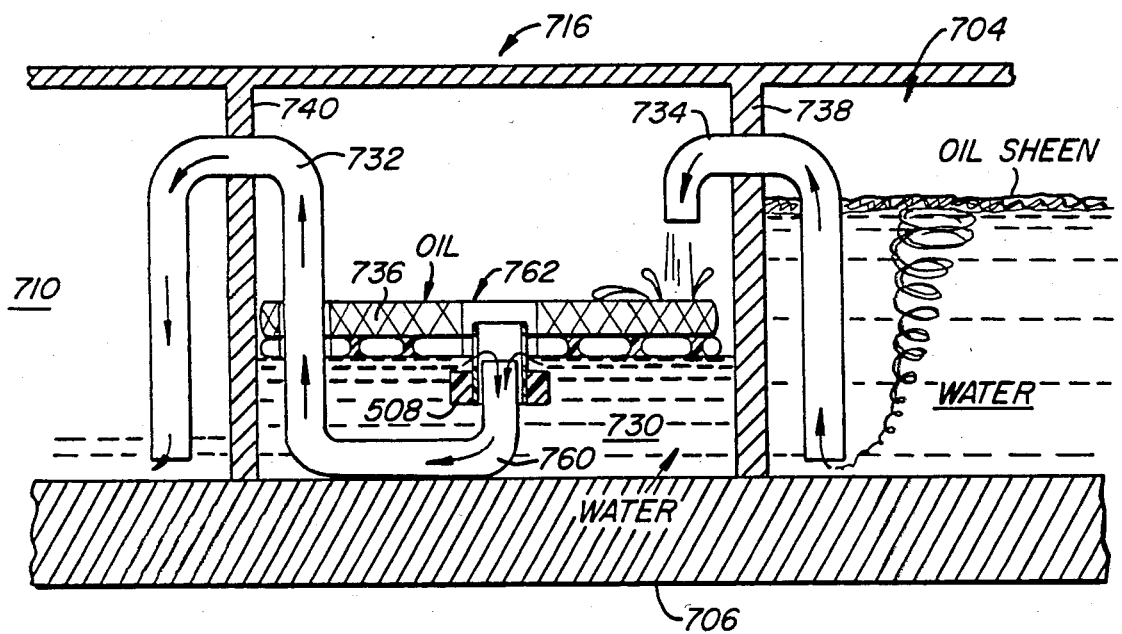
FIG.—15.

FLOW REGULATING DEVICE

This is a division of application Ser. No. 628,749, filed July 9, 1984, now U.S. Pat. No. 4,624,278 which is a continuation-in-part application of copending U.S. patent application Ser. No. 291,355, filed Aug. 10, 1981 now U.S. Pat. No. 4,458,714.

TECHNICAL FIELD

This invention relates generally to the regulation of fluid flowing through an aperture and, more specifically, to a moveable plug for permitting the flow of one type of liquid through an aperture and preventing the flow of another type of liquid through the same aperture.

BACKGROUND ART

In general ship operation, there is a basic requirement that any water which lands on the deck of a ship be drained to prevent the accumulation of such water. Typically, the water is discharged through scuppers into the water below. Inevitably, and especially in connection with the operation of oil tankers, pollutants, such as oil, are also present on the decks of the ship and are also discharged. While it is desirable to remove all liquids from the deck of the ship, current environmental concerns render discharge of oil into the water below undesirable, if not illegal.

As such, the typical scupper arrangement is unsatisfactory. Typically, a scupper system includes a plurality of passageways leading from the deck of the ship to the side of the ship and open thereto. Either a manually moveable plug or hinged one-way doors within the scupper regulate the flow through the scupper. These previous scupper arrangements allow all liquids present on the deck of the ship to be discharged, and are incapable of discriminating between oil and water, for example.

In the case of the manually removable scupper plug, there is the added inconvenience of having to remove and replace the plug whenever any discharge of liquid is desired.

DISCLOSURE OF INVENTION

The foregoing and other problems of prior art scupper plugs are overcome by the present flow regulating device of the type for regulating fluid flow through an aperture in the presence of a first and a second fluid, the fluids having different densities, and being immiscible with each other. The device comprising a moveable plug having a density which is less than the density of the denser fluid but greater than the density of the less dense fluid and a flow aperture closure means. The moveable plug floats in the denser fluid and sinks in the less dense fluid and is moveable between a first position and a second position. In one embodiment, the plug has a mating surface which is shaped to seal the flow aperture upon contact with the aperture and is positioned so that it will contact the flow aperture whenever a predetermined quantity of the denser fluid is present. In another embodiment, the movement of the plug actuates pump means which then draw fluid from the aperture.

A guide means, for example, a cage, a pipe or a number of rods can be included to align the plug with respect to the aperture.

In the embodiment employing a mating surface and where water and oil are present, the oil would be the less dense fluid and the water will be the denser fluid. Thus, it can be seen that because the density of the plug is selected so that it floats in water and sinks in the oil, the flow aperture will remain open, and any water present will drain through the aperture, until such time that a predetermined amount of the water remains. At that point, the plug will make contact with the aperture, thereby sealing it, and preventing the oil from entering the aperture. The fluid flow, depending upon the kind of fluid present, can be regulated in either the top-to-bottom direction or bottom-to-top direction. For example, in the case where oil is present in a water storage tank, the oil can be drawn off from the top of the tank, while water can be prevented from escaping, by orientating the plug below the aperture, the aperture being located at the top of the tank. Water can then be pumped into the tank, thereby causing the liquid level in the tank to rise. The oil, which floats on top of the water, emerges through the flow aperture until such time that substantially all of the oil has been drawn off and the plug contacts with the flow aperture, thereby sealing it.

It is often desireable, in the use of the plugs of the present invention, to maximize the fluid tightness of the seal between the aperture and the plug structure when oil, or other target fluids, are present and to maximize the bouyant force applied to the plug when the fluid to be drained is present. Further, it has been found that the addition of means for reducing turbulent flow of the subject fluid greatly increases the effectiveness of the present invention in the regulation of the flow of the immiscible fuilds.

It is, therefore, an object of the present invention to provide a flow regulating device which regulates the flow of fluids through a flow aperture.

It is a further object of the present invention to provide a flow regulating device in which the movement of a moveable plug controls the flow of fluids through a flow aperture.

It is a still further object of the present invention to provide a moveable plug which seals an aperture to the flow of one fluid while opening the aperture to the flow of a different fluid having a different density.

It is another object of the present invention to provide an automatic scupper plug means for the selective draining of fluids from the deck of a ship.

It is another object of the present invention to provide a scupper plug which automatically permits water to drain through the scupper while preventing oil from draining through the scupper, the scupper plug comprising a material which is resistant to oil.

It is still another object of the present invention to provide a scupper plug which includes means for maximizing the sealing force applied to the sealing surface of the scupper plug when fluid is present, the outflow of which is to be prevented.

It is still another object of the present invention to provide a scupper plug including means for aiding in the separation of the sealing surface from the aperture when the fluid to be drained is present.

It is a further object of the present invention to provide a scupper plug including means for reducing the turbulent flow of the subject fluid in the vicinity of the scupper plug.

The foregoing and other objectives, features and advantages of the invention will be more readily understood upon consideration of the following detailed description of certain preferred embodiments of the inven-

BRIEF DESCRIPTION OF THE DRAWINGS

FIG. 1 is a cross-sectional view of one embodiment of the invention.

FIG. 2 is a cross-sectional view of another embodiment of the present invention.

FIG. 3 illustrates an alternative configuration of the present invention.

FIG. 4 is a top view of one embodiment of the moveable plug taken along lines 4—4 of FIG. 2.

FIG. 5 illustrates a further embodiment of the present invention wherein plug movement controls pump means.

FIG. 6 illustrates an additional embodiment of the present invention including a retaining latch.

FIG. 7 illustrates a variable density plug.

FIG. 8 is a cross section of a further embodiment of the present invention having settling chamber means.

FIG. 9 illustrates the extension plug structure of the embodiment of FIG. 8, including the sealing surface of said plug structure.

FIG. 10 illustrates the cross section of another embodiment of the present invention including means for enhancing the separation of the plug from the scupper means.

FIG. 11 is a top view of the embodiment of FIG. 10.

FIG. 12 illustrates a still further embodiment of the present invention wherein a plug structure is coupled to a sealing section by lever means.

FIG. 13 illustrates a modification of the structure of FIG. 12, including an oil catch.

FIG. 14 illustrates a variation of the embodiment of FIG. 12 which employs a hydraulic system for transmitting force from the float portion to the plug portion thereof.

FIG. 15 illustrates a variation of the embodiment of FIG. 12 which employs the plug structure of FIG. 9.

BEST MODE FOR CARRYING OUT THE INVENTION

Referring more particularly to FIG. 1, one embodiment of the invention will now be described. A plug 10 has a surface 12 which is shaped to mate with flow aperture 14. The plug 10 is aligned with respect to the flow aperture 14 so that the mating surface 12 moves easily in and out of contact with the flow aperture 14. In order to facilitate this alignment, guides can be used, such as rods 16 as shown in FIG. 1, a pipe, or a cage, for example.

The flow aperture, which is to be sealed by the plug 10, can be the opening of the scupper itself, see FIG. 1, or can be included in a base member 18, which is positioned within a scupper tube 17. The internal scupper area is designated by reference numeral 21. FIGS. 2 and 3 illustrate the use of such a base member 18, and the location of the flow aperture 14 therein, within the scupper tube 17.

The plug can take on a number of shapes which includes a ball shape 210, as shown in FIG. 3; a cap shape 10, as shown in FIG. 1; a cone shape 310, as shown in FIG. 2; or a cylindrical shape as in FIG. 6. The principal requirement for all of the plug shapes is that, for the density of plug material used, the buoyancy of the plug is to be such that the plug will float in the denser liquid 11 (positive buoyancy) and sink in the less dense liquid 13 (negative buoyancy).

For example, water has a specific gravity of 1.0, while petroleum products have specific gravities which range between approximately 0.78 and 0.91. Alaskan crude oil, for example, has a specific gravity which ranges from approximately 0.80 to 0.85. For the above combination of oil and water, the buoyancy of the plug 10 should be selected to fall between 1.0 and 0.91; for example 0.95.

The buoyant force which acts upon an object submerged in a fluid is equal to the weight of that body of fluid which the submerged object displaces. When the buoyant force is less than the weight of the object, the object will sink. On the other hand, if the buoyant force is greater than the weight of the object, the object will float. Therefore, in order to provide a plug which sinks in oil and floats in water, the volume of the plug and the weight of the plug are selected to provide a buoyant force for the plug in water which is greater than the weight of the plug and, on the other hand, a buoyant force for the plug in oil which is less than the weight of the plug.

An additional consideration in the construction of the plug 10 is the effect of the chemical properties of the various fluids present upon the material used to construct the plug. For example, in the presence of petroleum products, a rubber material would be unsatisfactory. In such case, one satisfactory material is a combination of epoxy, sawdust, and iron filings or shavings. The proportions of each could be varied to achieve the desired volume and density. Alternatively, steel or lead is also a satisfactory material. On the other hand, if acids are involved, metallic materials would be unsatisfactory but plastics could be used.

While the primary consideration in the construction of the plug 10 is that the weight and volume, the shape of the plug affects the effectiveness with which the aperture can be sealed in the presence of different quantities of the various fluids.

FIG. 3 illustrates one embodiment wherein a spherically shaped plug 210 is utilized. The advantage of such a shape is that any surface of the plug is suitable for sealing the aperture 14. On the other hand, the spherical shape of the plug presents a small surface area upon which the buoyant force of water, for example, can work to dislodge the plug from the flow aperture 14, when the plug is surrounded by water.

This problem is reduced by the shape of the plug shown in FIG. 1. This embodiment utilizes a half sphere as the mating surface 12 for sealing the flow aperture, while providing a large surface area upon which the buoyant force of the water can act. This large surface area is in the form of the disk-like portion of the plug. With such a configuration, when the water fully surrounds the plug, a large buoyant force can be exerted upon the under side of the plug. A large upward buoyant force is thereby provided to overcome the downward pressure exerted upon the plug by the liquid above the plug, and any negative pressure present within the scupper hole itself.

A further embodiment of the plug shape is illustrated in FIG. 2, wherein a cone-shaped plug 310 is utilized. The angularly rising walls of the cone above the point where the cone mates with the flow aperture 14, provide a sufficient surface area upon which the buoyant force can act.

A further consideration in the configuration of the present invention is the alignment of the plug 10 with the flow aperture 14. In FIG. 1, rods 16 are used to guide the plug 10. An alternative guide can be a pipe (not shown) having an inner diameter which is slightly larger than the maximum diameter of the particular plug configuration used. Another guide can be constructed of a screen cage, not shown.

In the case of the screen cage guide and the rod guide 16, the liquids are free to enter the scupper and aperture area and to interact with the plug from all directions. On the other hand, when a pipe guide is used passageways should be provided for liquid flows. In the case where the plug is positioned within the scupper tube 17 itself, as in FIGS. 2 or 3, passageways can be provided either through the plug or around the plug, so that the liquids may pass to the bottom side of the plug. Otherwise, the denser fluid will not reach the underside of the plug and the plug will not be dislodged from the flow aperture 14. FIG. 2 illustrates vertical passageways 24 provided within the plug 310 to permit the passage of the fluids. FIG. 4 is a top view of the cone plug 310 showing the position of the passageways 24.

Alternatively, the cone plug diameter can be made smaller to provide space between the plug and the guide wall to permit the fluids to pass. In FIG. 3, the maximum outer diameter of the plug 210 is shown to be less than the inner diameter of the scupper tube 17, thereby permitting fluid to pass between the tube 17 and the plug 210, to the bottom of the plug 210.

A further embodiment to the present invention includes a retaining means to prevent the plug from being dislodged from the guide during times of high and tubulent liquid flows. In FIG. 3, a cross-pin 19 and chain 20 combination is illustrated. In FIG. 2, a cross-pin 19 across the top of the guide 17 prevents the plug 310 from being expelled from the guide 17.

In a further embodiment of the present invention, the flow aperture 14 is shaped to have an annular lip 26, FIG. 2, which enhances the seal obtained by the mating of the plug 10 with the flow aperture 14. FIG. 3 illustrates the use of a lip 26 formed as a part of the base 18. FIG. 1 illustrates the use of "O" rings 28, as an alternative to the lip 26, attached both to the flow aperture 14 and to the mating surface 12 of the plug 10.

Up to this point use of the present invention to prevent the flow of less dense fluids has been discussed. Conversely, the plug 10 can be used in reverse fashion to permit the flow of the less dense liquid through the aperture and to prevent the flow of the denser liquid through the aperture. To implement this the plug 10 is located below the flow aperture 14 as are the liquids. The mating surface 12 is positioned on the plug to mate with the flow aperture 14 as the level of the denser liquid rises toward the flow aperture. Because the less dense liquid is immiscible with the denser liquid, and thereby floats on the denser liquid, the less dense liquid will flow through the flow aperture 14 as the level of the denser liquid rises toward the flow aperture 14. This type of flow is counter gravitational; that is, means such as a pump provide sufficient energy to the contained fluids such that gravitational force is overcome and the fluids flow against gravity. Eventually, the plug 10 and mating surface 12 will make contact with the flow aperture, thereby sealing the flow aperture 14 to any liquid flow.

While, for illustrative purposes, the present invention has been described in the context of oil and water as the fluids of interest, it is to be understood that the invention is operable with any fluids which are immiscible and which have different densities.

A still further embodiment of the present invention utilizes the positive/negative buoyancy of the plug to control pump means (not shown) for pumping one liquid in the presence of a different liquid. See FIG. 5. A platform 100 is constructed to float upon the liquids which are present, the platform 100 being aligned within the liquid by guides 102. Positioned on the platform 100 are a plug 104 and guide 106 combination, the plug 104 being connected to an electronic switch or valve control 108. The electronic switch or valve control 108 is communicatively coupled to a pump means. The flow aperture 14 is contained within the platform 100 in the form of an outlet pipe 114 which is communicatively coupled to the pump means. The moveable plug 104 and guide 106 combination extend through the platform 100 through plug aperture 103.

The portion of the outlet pipe 114 which extends into the liquid is positioned to coincide with the level, with respect to the platform 100, of the denser liquid 11, at which the plug 104 deactivates the switch 103 to turn the pump means off. This position is referred to as the first position. Preferably, this first position corresponds to the condition where substantially all of the less dense liquid 13 has been drawn off. Whenever there is a significant amount of less dense liquid 13 present, the platform 100 will float thereon and the plug 104 will sink therein, thereby causing the plug 104 to assume a second position wherein the switch 108 is activated by the plug 104 and the pump means is turned on.

Apertures 124 are shown in the portion of the guide means 106 which is submersed in the liquids. These apertures 124 permit the various liquids to interact with the plug 104. Because the platform 100 floats on the surface of the liquid, no matter what the level of the liquids, the plug 104 will be operative to control the pumping of the less dense fluid from the tank.

During times of rough weather, the resulting motion of the ship can be sufficient to dislodge the flow regulating device of the present invention, thereby permitting fluids to escape through the scupper tube, thus permitting any oil which has accumulated to escape. It is, therefore, highly desirable to devise a means for retaining the scupper plug in contact with the flow aperture whenever any appreciable amount of oil is present, but at the same time to permit the plug to be dislodged from the flow aperture when only water is present.

FIG. 6 illustrates one embodiment of the present invention wherein the above is accomplished. This embodiment utilizes a cylindrically shaped plug and a latching means. The plug 400 is positioned within the scupper tube interior 21 and above the base member 18, which contains the aperture 14. The plug 400 has a diameter which is smaller than that of the scupper tube 17. The scupper tube 17 has a retaining lip 402 positioned at its top. The inner diameter of the retaining lip 402 is selected to be smaller than the diameter of the plug 400 so that the plug will be retained within the scupper tube even in the roughest seas. Also positioned on the scupper tube, approximately one-third of the distance from the top of the tube, is a retaining collar 404. The inner diameter of this collar is selected so that the plug 400 can easily move up and down through it. Positioned toward the top of the plug 400 is a fixed collar 406. The outer diameter of this fixed collar 406 is chosen to be larger than the inner diameter of the retaining collar 404.

Positioned below the retaining collar 404, and concentrically with the plug 400 is a moveable collar 408.

The inner diameter of the moveable collar 408 is selected so that the collar 408 is free to move up and down along the plug 400. Likewise, the outer diameter of the moveable collar 408 is selected to be larger than the inner diameter of the retaining collar 404 so that the moveable collar 408 is prevented from travelling upward in the scupper tube interior 21 beyond the retaining collar 404.

The moveable collar 408 has a density which is less than the density of any of the fluids expected to be present. As such, the moveable collar 408 will float in any of the fluids. The moveable collar also contains a number of magnetic elements 412. These magnetic elements 412 can take the form of a ring of magnetic material embedded along the circumference of the moveable collar, or a number of magnetic elements which are embedded at specific locations along the circumference of the collar. The fixed collar 406 also contains magnetic material 410 embedded therein. As with the moveable collar 408, this magnetic material can be a ring of magnetic material, or individual pieces of magnetic material. The surrounding material, including the scupper tube 17 material, should be non-magnetic. In any case, the north/south orientation of the magnetic material in the fixed collar 406 is positioned with respect to the north/south orientation of the magnetic material embedded within the moveable collar 408 such that the fixed collar 406 and the moveable collar 408 are magnetically attracted to each other. In this manner, whenever the fixed collar 406 and the moveable collar 408 are in close proximity to each other, a magnetic coupling force between the two collars will arise, thereby causing fixed collar 406 to be drawn tightly against retaining collar 404. This occurs when the level of fluid in the scupper tube 17 approaches the retaining collar 404 position and an appreciable amount of the fluid is less dense fluid 13. In this manner, plug 400 can be latched into a predetermined position, from which it will not be dislodged until the user manually uncouples the fixed collar 406 from the moveable collar 408.

The distance of the retaining collar 404 from the base member 18 is selected so that the mating surface 12 of the plug 400 is in contact with the aperture 14 when the fixed collar and moveable collar are in a latched position. In place of a retaining collar 404, restraining structures, such as cables 405, can be used to limit the maximum distance that the moveable collar can be positioned from the aperture 14. See FIG. 6.

The fixed collar can be uncoupled from the moveable collar 408 in a number of ways, including the use of a chain 414. The user simply pulls on the chain 414, supplying enough force to overcome the magnetic coupling force.

A further embodiment of the moveable plug is illustrated in FIG. 7. The plug illustrated therein provides a variable density. A variable density property is useful for several reasons. One reason is to provide a delay upon the entry of fluid into the scupper hole before the plug is dislodged from the aperture. This delay is useful when both fluids are flowing into the scupper hole at once. Though the fluids are defined to be immiscible, there is some initial mixing when the liquids first enter the scupper tube. There is a finite delay between the time the fluids first enter the scupper tube, and the point in time at which the fluids are separated from each other. The variable density plug to be described in detail following, ensures that a predetermined amount of fluid has entered into the scupper tube, and that at least a certain, portion of that fluid is the denser fluid 11 before permitting the plug to be dislodged from the aperture.

A second reason for providing a variable density plug is to make doubly sure that in the presence of the less dense fluids, the plug will sink, and in the presence of the denser fluids, the plug will float.

Referring more specifically to FIG. 7, the variable density plug will now be described. In FIG. 7, the variable density plug 450 is shown positioned within a scupper tube 21. The plug itself includes an outer body 452, an inner plug 454, and air passageway 456, and a number of fluid passageways 458. The outer body 452 has a chamber 460 in which the inner plug 454 is positioned. Also included with the variable density plug is a valve means 462 for controlled sealing of the air passageway 456. One embodiment of such valve means is a stopper-like member which is shaped to seal the air passageway 456. The variable density plug includes means for coupling the inner plug 454 to the valve means 462. In FIG. 7 this coupling means is shown to be a shaft 463, for example.

The density of the inner plug 454 is selected so that it is greater than the density of the less dense fluid 13, and less than the density of the denser fluid 11.

The variable density plug 450 operates in the following manner. When no fluid is present within the scupper tube interior 21, the mating surface 12 of the variable density plug 450 is in contact with the aperture 14. The chamber 460 is filled entirely with air. The valve means 462 is positioned so that air can flow between the chamber 460 through the air passageway 456 to the exterior of the variable density plug 450. The fluid passageways 458 which are positioned below the air passageway 456 provide access to the chamber 460 from the exterior of the variable density plug 450.

When fluid first enters the scupper tube interior 21, the fluid flows into the chamber 460 through the fluid passageway 458. If the fluid is the less dense fluid 13, the inner plug 454 will not be affected by the entry of the less dense fluid into the chamber 460. As more fluid flows into the chamber 460, the air, originally within the chamber 460, is permitted to escape through the air passageway 456. In this manner, the fluid level of the less dense fluid 13 within the chamber 460 will follow the fluid level of the less dense fluid 13 in the scupper tube interior 21, and external to the variable density plug 450. Therefore, it is ensured that the variable density plug 450 will have a density no greater than that of the less dense fluid 13 and therefore will not be dislodged from contact with the aperture 14.

If, on the other hand, the denser fluid 11 enters the scupper tube 17, the denser fluid 11 entering the chamber 460 through the fluid passageway 458 will tend to cause the inner plug 454 to be buoyed upward. As such, when sufficient denser fluid 11 enters the chamber 460, the buoying of the inner plug 454 by the denser fluid 11 causes the valve means 462 to close off the air passageway 456 to any further escape of air from the chamber 460. In this manner, the density of the variable density plug 450 is fixed at a maximum value. The positioning of the inner plug 454, the valve means 462, and the length of the chamber 460 are chosen so that when the valve means 462 closes the air passageway 456 to further escape of any air, the density of the variable density plug 450 will be well below that of the denser fluid 11.

It can likewise be seen that when a mix of less dense and denser fluid enters the scupper tube, the density of the mixture must be greater than the density of the inner plug 454 in order that the inner plug be buoyed upward to close off the air passageway. Until such time that this density is achieved, the variable density plug 450 will remain in contact with the aperture and prevent the escape of any liquid through the aperture. It can also be seen that, after the two fluids have had enough time to separate from each other, at that point the denser fluid 11 will have an opportunity to act upon the inner plug 454 and cause the air passageway to be closed off, thereafter permitting the variable density plug 450 to be dislodged from the aperture 14.

The variable density plug 450, therefore, provides a predetermined amount of delay before permitting itself to be dislodged from the aperture 14, thereby ensuring that only the desired fluid 11 escape through the aperture. The variable density plug 450 also provides a double check on the density of the plug with respect to the less dense 13 and the denser fluid 11, so that the plug 450 has a density which is greater than the density of the less dense fluid 13, and less than the density of the denser fluid 11.

Referring to FIG. 8, a cross sectional view is shown of a further arrangement for permitting the separation of the fluid, which enters the scupper hole 500 into its immiscible fluid component parts. An aperture extension 502 is coupled at one end to the aperture 504 and so that its free end extends into the scupper 500. Disposed about the circumference of the free end of extension 502 is an "O" ring 506.

Extension plug 508 is slideably positioned about extension 502 for movement between an opened position and a closed position. Extension plug 508 has a seal portion 510 and a float portion 512 which are coupled together by an extension portion 514. FIG. 9 provides a perspective view of extension plug 508.

Surrounding extension plug 508 and surrounding and extending above extension 502, is an outer envelope 516. One end of outer envelope 516 is positioned at the bottom of scupper 500 so that it surrounds aperture 504, and so that the free end of outer envelope 516 is positioned toward the top of scupper 500.

The diameter of outer envelope 516 is selected so that a passageway is formed between the wall of scupper 500 and outer envelope 516. Positioned about and sealing the free end of outer envelope 516 is an inflatable cap 518. The other end of outer envelope 516 includes a number of openings 520 through which the subject fluid is permitted to flow into the interior of outer envelope 516.

In operation, the subject fluid flows into scupper 500 and toward the bottom thereof. Cap 518 prevents the fluid from entering outer envelope 516 via its free end. The subject fluid flows into the interior of outer envelope 516 via openings 520. As the level of the subject fluid rises in the space between outer envelope 516 and the walls of scupper 500, the level of the subject fluid within outer envelope also rises. However, as the level gets higher, the degree of mixing of the constituent immiscible fluids decreases in the vicinity of openings 520. As such, where for example, oil and water are found in the subject fluid, the water component will tend to remain in the vicinty of the openings 520, while the oil component will tend to rise upward as the water component level increases. Under these conditions, most of the fluid entering the interior of the outer envelope means 516 will be the water component.

Further, before the fluid within the outer envelope 516 can exit, it must rise at least to the level of the free end of extension 502. This ensures that the level of fluid between scupper 500 and outer envelope 516 will also correspond to at least the level of the free end of extension 502 before any fluid can flow out of extension 502. This threshold fluid level further aids the separation process by isolating the fluid in the vicinity of openings 520 from turbulent flows entering the scupper.

The float portion 512 of extension plug 508 has a density and volume such that it will float in water and sink in oil. Moreover, the seal portion 510 of extension plug 508 is preferably constructed of a thin membrane, such as polyethylene or polypropylene, which is oil resistant, where oil is the fluid sought to be controlled, and which is conformable, so that the seal portion conforms to the shape of "O" ring 506 when extension portion 508 is in a seated position. As such, a more fluid tight seal can be obtained.

When the subject fluid entering scupper 500 is substantially comprised of oil, there will be insufficient buoyant force to dislodge seal portion 510 from contact with "O" ring 506 and hence the extension 502 will remain sealed to the flow of the fluid within outer envelope 516.

On the other hand, when a substantial portion of the subject fluid comprises water, a sufficient amount of water may enter outer envelope 516 such that extension plug 508 can be moved out of its seated position. When this occurs, the free end of extension 502 is opened and fluid is permitted to flow into extension 502 and out of aperture 504.

The relationship between inflatable cap 518 and the length of expansion portion 514 will now be described in greater detail. The inflatable cap 518, to a limited extent, simulates an exhaust port for outer envelope 516. This becomes significant when extension plug 508 is in a seated position and fluid first enters the outer envelope 516. Inflatable cap 518 initially expands to accomodate the increase in volume required to accomodate the entering fluid. The expansion provided by infaltable cap 518 is limited, however, so that the entry of more than a predetermined amount of fluid is inhibited. Beyond such a point, additional fluid can enter the outer envelope 516 only when extension plug 508 is in an unseated position. The latter occurs only when there is a sufficient amount of water in the outer envelope 516 to provide the buoyant force to the float portion 512 so as to disengage seal portion 510 from "O" ring 506. The length of extension portion 514 is thus selected so that the float portion 512 will be suspended at a point in the outer envelope 516 which corresponds to the threshold water level desired to be present within outer envelope 516 before any fluid is permitted to be discharged out of extension 502.

The following have been found to be suitable dimensions for a structure constructed according to this embodiment of the present invention:
Scupper: Dia.: 10" Depth: 10"
Outer Envelope: Dia.: 4" Ht.: 11"
Extension: Dia.: 1¼" Ht.: 9"
Extension Plug:
  Float: O.D.: 2.375" I.D.: 1.25" Ht.: 1.5"
  Ext.: I.D.: 1 5/16" Ht.: 4.5"
Outer Envelope Opening: Area: 4.5 sq. in.
With a structure constructed in accordance with such dimensions, it has been found that only a negligible amount of oil is permited to exit aperture 504 under typical oil/water mixtures and conditions. In this example, the outer envelope, extension, and extension portion of the extension plug are constructed of polyvinylchloride, while the float portion is constructed from wood. It is to be understood that whatever material is used, the collective density of the extension plug 508 is such that it floats in the denser fluid and sinks in the less dense fluid of intrest. For example, extension portion 514 can be constructed from stainless steel which has been suitably perforated to provide a density which, when combined with the density of the float portion 512, will provide the desired overall density. Additionally, as can be seen from FIG. 9, the extension portion 514 has a number of slots 522 which permit fluid to pass easily into the interior of extension plug 508. Other forms of extension portion 514, such as parallel rods, a grid, or other connecting structure will operate satisfactorily provided that (1) the buoyant force from float portion 512 is transmitted to seal portion 510, and (2) fluid is permitted to pass freely into the interior of extension plug 508.

It is to be understood that although this embodiment of the present invention has been illustrated by way of example and the specific dimensions above, such dimensions are intended only to illustrate but not limit the structures which can be constructed in accordance with the present invention.

As discussed earlier, it is desirable to provide a plug structure which can be deseated from the aperture when water, or the fluid which is desired to be discharged, is present. The plug structures described supra, provide extended surface areas in order to enhance deseating. In FIGS. 10 and 11 an alternative structure is illustrated. The structure is positioned in a scupper having walls 630 and above the aperture 600. The structure includes an outer cup 628 and an inner cup 626.

The outer cup 628 is positioned in scupper 630 with closed end above and spaced apart from aperture 600 so as to form a passageway 634 between the walls of scupper 630 and outer cup 628. The inner cup 626 is disposed within the outer cup 628 with closed end adjacent but spaced apart from the closed end of outer cup 628 so that a passageway 632 is formed between inner cup 626 and outer cup 628. As can be seen from FIG. 10, passageway 628 is in communication with passageway 634 at the open end of outer cup 628. Inner cup 626 includes flanges 627 at its opened end which rest upon the top of scupper 630 so that all of the subject fluid to be discharged enters the scupper 638 by way of the inner cup 626.

Inner cup 626 has an exit port 602 positioned in the closed end therof. An inner chamber 604 is formed at the bottom of inner cup 626 by way of a dividing structure 606. Positioned in the dividing structure 606 is an entrance port 616 which permits communication between the interior of inner cup 626 and inner chamber 604.

An air conduit 622 which defines an air passageway 618, and a fluid conduit 624 which defines a fluid passageway, extend from the dividing structure toward the open end of inner cup 626. At the open end of inner cup 626, fluid conduit 624 and air conduit 622 are shaped so that their free ends are inverted back toward the bottom of inner cup 626. Additionally, air conduit 622 extends a greater distance toward the open end of inner cup 626 than does fluid conduit 624. At the dividing structure 606, passageways 618 and 620 both communicate with inner chamber 604. Thus, a number of flow paths exist: (1) interior of inner cup 626 to inner chamber 604 via entrance port 616, inner chamber to passageway 632 via exit port 602, passageway 632 to aperture 600 via passageway 634; and (2) fluid passageway 620 to inner chamber 604, thence to passageway 632 via exit port 602, and thence to aperture 600 via passageway 634.

A plug 614 is aligned with entrance port 616 in a manner similar to that described in connection with FIGS. 1 through 7 above. A shaft 610 extends coaxially from plug 614 for use in maintaining alignment of the plug 614 in the inner cup 626. Positioned for slideable movement about shaft 610 is seal 612. While plug 614 is constructed to float in the fluid to be discharged and to sink in the fluid to be blocked from discharge, float 612 is constructed to float in both liquids. Float 612 has a fluid passageway sealing surface 636 and and air passageway sealing surface 638 which are spaced apart on float 612 so that they can simultaneously seal the free ends of air conduit 622 and fluid conduit 624 respectively when float 612 is moved into contact therewith.

In operation, when there is initially no fluid in the inner cup 626, plug 614 is positioned upon entrance port 616 thereby sealing it. Float 612 rests upon plug 614. As fluid enters inner cup 626, the position of float 612 follows the level of the fluid. Depending upon the proportions of the immiscible fluids present, a buoyant force is applied to plug 614 by the fluid in the inner cup 626. Because air and fluid passageways are in communication with the bottom of plug 614, via inner chamber 604, they act as a "vacuum breaker" for the seal which is formed between plug 614 and entrance port 616. As such, when the appropriate amount of water, for example, is present in inner cup 626, plug 614 can be more easily deseated from entrance port 616 than if air and fluid passageways 618 and 620 were not present.

Float 612 acts to block off air passageway 618 and fluid passageway 620 when the level of fluid in inner cup 626 rises to the vicinity of these passageways. In this manner it can be ensured that no oil will escape through these passageways when substantially all of the subject fluid comprises oil. In the event that substantially all of the subject fluid comprises water, the plug 614 is contructed so that it will deseat from entrance aperture 616 before the level of the water in inner cup 626 reaches the level of the free ends of the air conduit 622 and fluid conduit 624.

FIGS. 12 and 13 illustrate a futher embodiment of the present invention. The advantage of the structure illustrated therein is that the buoyant force from the plug 700 is multiplied by the lever arm action of connecting arm 702. In one version of this embodiment, two compartments are provided: a compartment 704 which receives the subject fluid from the ship's deck 706 via entrance holes 708 and which houses plug 700, and a compartment 710 in which is enclosed the scupper 712 and a sealing structure 714. Compartment 704 is coupled to compartment 710 by way of a siphon arrangement 716.

Plug 700 is pivotably coupled at one end of lever arm 702 by way of rod 718 which extends through the top of compartment 704. Sealing structure 714 is pivotably coupled to lever arm 702 by way of rod 720 which extends through the top of compartment 710. A bellows arrangement (not shown) can be positioned about rod 720 where it emerges from compartment 710 to prevent fluids from entering compartment 710 from that point.

The other end of lever arm 702 is pivotably mounted to a point which is fixed with respect to deck 706. As shown in FIG. 12, lever arm 702 can be mounted to a vertical post 722 so as to pivot about point 724. By the arrangement shown in FIG. 12, the force applied by movement of plug 700 to sealing structure 714 is a multiple of the buoyant force, or gravitational force, applied to plug 700. The multiplying factor is related to the distance between the point at which plug 700 is coupled to lever arm 702 and pivot point 724, versus the distance between the point at which sealing structure 714 is coupled to lever arm 702 and pivot point 724. By the structure shown in FIG. 12, sealing structure 714 can be more easily deseated from aperture 712 and, similarly, seated with greater pressure on aperture 712.

Siphon structure 716 can take a number of forms. One such form utilizes an inverted U shaped pipe 726 which straddles a dividing wall 728. The end of U shaped pipe 726 which is positioned in compartment 704 is preferably located in close proximity to the ship deck 706. This is to increase the likelihood that the fluid drawn into pipe 726 is the denser of the fluids in the subject fluid.

In operation, the subject fluid flows onto deck 706 and enters compartment 704 through entrance holes 708. If the subject fluid comprises substantially the less dense fluid, plug 700 will not be provided with sufficient buoyant force to cause it to float. Conversely, the gravitational force acting upon plug 700 is multiplied along lever arm 702 and applied to sealing structure 714 to seal aperture 712. When a sufficient amount of the denser fluid is present in compartment 704, plug 700 will be buoyed upward. The buoyant force applied to plug 700 is transmitted along and multiplied by lever arm 702, and thereafter applied to sealing structure 714 to cause sealing structure 714 to be deseated from aperture 712. As force is applied to lever arm 702, the lever arm pivots about point 724. It is to be understood that other structures can be used in conjunction with level arm 702 to couple the transmitted force from plug 700 to sealing structure 714. For example, sealing structure 714 can be attached to a linear gear. The linear gear can be driven by a cylindrical gear which rotates about its center. In turn, the cylindrical gear can be driven eccentrically by the lever arm as attached to a point on the gear which is off center. The pivot point can then be positioned between the cylindrical gear and the plug.

Assuming that plug 700 is buoyed upward and sealing structure 714 is deseated from aperture 712, fluid being drawn into aperture 712 causes additional fluid to be drawn from compartment 704 through inverted U shaped pipe 726 into compartment 710.

In cold climates where freezing temperatures are present, a rain shield or other moisture barrier positioned about the pivot point 724 in FIG. 12 can be used to prevent the mechansim from becoming inoperative due to freezing.

FIG. 13 illustrates another version of siphon structure 716. This structure uses a separate compartment 730 and two inverted U shaped pipes 732 and 734. Positioned within compartment 730 is an oil absorbant pad 736. Pad 736 is positioned above and apart from the deck surface 706. U shaped plug 734, has one end which is positioned in compartment 730 and which has a length such that fluid flowing out of pipe 734 flows over the top of pad 736. Conversely, inverted U shaped pipe 732 has an elongated portion within compartment 730 so that it draws fluid from the vicinity of deck 706. This is where the denser fluid is likely to be present. Absorbant pad 736 serves to strip out any oil sheen from the fluid flowing into compartment 730. It has been found that the inverted U shaped type of arrangement creates a vortex which tends to draw any oil sheen on the surface water down through the water and into pipe 734 so that a small amount of oil is drawn into the second compartment 710. Absorbant pad 736 removes this oil. In order to maintain the separation of the absorbed oil from the water being routed to compartment 710, absorbant pad 736 can be supported apart from the bottom of compartment 730 by a grid or screen 742. Alternatively, absorbant pad 752 can be positioned on a platform which floats in the denser fluid and sinks in the less dense fluid. This platform can be constructed of wood or other suitable material. Absorbant pad 736 can be constructed in accordance with the pad disclosed in U.S. Pat. No. 4,031,839, issued June 28, 1977 to Pedone. Other suitable materials include Styrofoam, cork, and astroturf.

Dividing structure 738 is positioned between compartments 704 and 710, while dividing structure 740 is positioned between compartment 710 and compartment 730. Preferably, fluid tight seals are provided about the periphery of compartment 730 and 710 so that the only fluid passageways are provided by "U" shaped pipes 732 and 734.

Referring now to FIG. 14, the variation on the present invention of FIG. 12 is shown. There, instead of a lever arm, a hydraulic system is used for transferring force from plug 700 to sealing structure 714. Plug 700 is coupled to a piston 744 which is shaped for movement within a cylinder 746. Cylinder 746 is closed at the far end and has a port 748 positioned at the far end. The near end of cylinder 746 is shaped to permit rod 718 to extend into cylinder 746. Piston 744 has conventional seals to prevent the passage of hydraulic fluid between the piston and the walls of cylinder 746.

In compartment 710, sealing structure 714 is coupled to piston 750 via rod 720. Piston 750 is shaped for movement within cylinder 752. The far end of cylinder 752 is closed, while the near end thereof is shaped to permit the passage therethrough of rod 720. Seal 754, such as an "O" ring, are positioned in the near end of cylinder 752 and about rod 720 to prevent the passage of hydraulic fluid out of cylinder 752. A port 756 is positioned at the near end of cylinder 752. Piston 750 includes appropriate seals about its periphery to prevent hydraulic fluid from passing between piston 750 and the walls of cylinder 752. Port 756 is coupled to port 748 by conduit 758. This permits communication between the portion of of the interior of cylinder 746 which resides between piston 752 and the far end of cylinder 746, and the portion of the interior of cylinder 752 which resides between piston 750 and the near end of cylinder 752.

Preferably, the diameter and height of cylinder 746 is selected with respect to the diameter and height of cylinder 752, such that the ratio between the two is approximately 1 to 3. This provides a coupling factor by which the force applied to the float, or plug portion, 700 is multiplied as it is applied to piston 750 and hence sealing structure 714.

In operation, hydraulic fluid fills conduit 758, the space between piston 744 and the far end of cylinder 746, and the space between piston 750 and the near end of cylinder 752. As plug 700 begins to float in the presence of the denser fluid, such as water, piston 744 will be forced toward the far end of cylinder 746. In turn, this compresses the hydraulic fluid therein. This change in pressure is transmitted along conduit 758 to cause additional hydraulic fluid to flow into the space between piston 750 and the near end of cylinder 752. In turn, this causes piston 750 to be moved toward the far end of cylinder 752, hence causing sealing structure 714 to be displaced away from the scupper 712.

Preferably, sealing structure 714 will have a density such that, in the event of leakage of hydraulic fluid from cylinders 744 or 752, or from conduit 758, sealing structure 714 will remain in a closed position; i.e., in contact with scupper 712. Thus, in the event that the hydraulic system fails, no fluid will be permitted to flow into scupper 712.

As can be seen from FIG. 14, conduit 758, as well as cylinders 746 and 752, are positioned within compartments 704 and 710, respectively, with the conduit 758 also passing through compartment 716. In the preferred embodiment of the present invention, this provides added protection against freezing, and general physical damage.

Referring now to FIG. 15, a further embodiment of the structure of FIG. 13 is shown. In this embodiment, "U" shaped pipe 732 has an upturned extension 760 which is positioned within siphon structure 716. This causes "U" shaped pipe 732 to take on a "S" shape. The addition of extension portion 760 adds the requirement that the fluid level in siphon structure 716 exceed the height of the upturned end thereof before any fluid is permitted to flow out of siphon structure 716 and into compartment 710. Positioned about the upturned portion 760 is the extension plug 508 of FIG. 9. This adds an additional measure of flow regulation which prevents any fluid from flowing into extension portion 760 when there is insufficient denser fluid in siphon structure 716 to ensure that only the denser fluid will flow into extension portion 760.

Where a floating arrangement of pad 736 is utilized, an aperture 762 is provided having a diameter which is sufficiently large to permit extension plug 508 to pass through pad 736 when pad 736 is in the vicinity of the bottom of siphon structure 716.

It is to be understood that, while the present invention has been described in terms of a marine application, it is equally applicable wherever it is desired to permit the flow of one immiscible fluid through an aperture while preventing the flow of another immiscible fluid, of different density, through the aperture. Such applications include street sewers and storm drains.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

I claim:

1. An apparatus for regulating the flow through an aperture of a subject fluid comprising a first immiscible fluid and a second immiscible fluid, the first fluid having a specific gravity which is less than that of the second fluid, wherein the aperture is positioned in a scupper chamber, the appartus comprising:

a first cup-shaped structure having an open and a closed end and positioned in the scupper chamber with closed end toward but spaced apart from the aperture so that a first passageway is formed between the walls of the scupper chamber and the first cup-shaped structure;

a second cup-shaped structure positioned concentrically within the first cup-shaped structure for receiving the subject fluid and having an open end and a closed end, said closed end facing the closed end of the first cup-shaped structure, wherein the diameter of the second cup-shaped structure is selected so that a second passageway is formed between the first and second cup-shaped structures which second passageway is in communication with said first passageway, and further wherein the second cup-shaped structure includes a dividing structure positioned toward the closed end of the second cup-shaped structure so as to form a secondary chamber in the interior of the second cup-shaped structure;

an entrance port positioned in the dividing structure so as to connect the secondary chamber to the remainder of the interior of the second cup-shaped structure;

an exit port positioned in the closed end of the second cup-shaped structure and in alignment with the entrance port so that the interior of the second cup-shaped structure communicates with the aperture by way of the entrance port, the secondary chamber, the exit port, and the first and second passageways;

a liquid passageway in communication with the secondary chamber and extending toward the open end of the second cup-shaped structure; and an air passageway in communication with the secondary chamber and extending toward the open end of the second cup-shaped structure and beyond the liquid passageway; and plug means positioned in the second cup-shaped structure and in alignment with the entrance port for movement between a first and a second position for sealing the entrance port to the flow of all fluids when the plug means are in the second position, wherein the plug means float in the second immiscible fluid and sink in the first immiscible fluid.

2. The apparatus of claim 1 further including means positioned for movement along the axis of the plug means between a first and a second position, for sealing the air passageway and the liquid passageway when the sealing means are in the second position, wherein the sealing means floats in both the first and second immiscible fluids, and further wherein the sealing means attain the second position when the second cup-shaped structure is filled with the subject fluid.

* * * * *